US010227838B2

(12) United States Patent
Dillard et al.

(10) Patent No.: US 10,227,838 B2
(45) Date of Patent: Mar. 12, 2019

(54) DRILLING SYSTEM AND METHOD HAVING FLOW MEASUREMENT CHOKE (71) Applicant: Weatherford Technology Holdings, LLC, Houston, TX (US)

(72) Inventors: Walter S. Dillard, Houston, TX (US); Lev Ring, Houston, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 148 days.

(21) Appl. No.: 15/150,522

(22) Filed: May 10, 2016

(65) Prior Publication Data
US 2017/0328151 A1 Nov. 16, 2017

(51) Int. Cl.
*E21B 21/08* (2006.01)
*E21B 21/10* (2006.01)
*G01F 1/40* (2006.01)
*G01F 1/88* (2006.01)
*G01F 1/42* (2006.01)
*G01F 1/44* (2006.01)

(52) U.S. Cl.
CPC ............ *E21B 21/08* (2013.01); *E21B 21/106* (2013.01); *G01F 1/40* (2013.01); *G01F 1/88* (2013.01); *G01F 1/42* (2013.01); *G01F 1/44* (2013.01)

(58) Field of Classification Search
CPC .......... E21B 21/08; E21B 21/106; E21B 7/00; E21B 47/06; E21B 44/00; E21B 47/124
See application file for complete search history.

(56) References Cited

U.S. PATENT DOCUMENTS

| 4,556,956 | A  | 12/1985 | Dickenson |
| 5,251,148 | A  | 10/1993 | Haines et al. |
| 6,782,949 | B2 | 8/2004  | Cove et al. |
| 7,044,237 | B2 | 5/2006  | Leuchtenberg |

(Continued)

FOREIGN PATENT DOCUMENTS

| EP | 0 540 079 B1 | 12/1995 |
| GB | 2 123 983 A | 2/1984 |
| WO | 2014/007797 A1 | 1/2014 |

OTHER PUBLICATIONS

MEZUR USA LLC, "X-OMEGA™ Flow and Density Out," copyright 2016, obtained from www.mezurx.com on Jan. 11, 2016, 1-pg.

(Continued)

*Primary Examiner* — David J Bagnell
*Assistant Examiner* — Yanick A Akaragwe
(74) *Attorney, Agent, or Firm* — Blank Rome LLP (57) ABSTRACT

A drilling system used with drilling fluid for drilling a wellbore has at least one choke in adjustable communication with flow from the wellbore. A programmable control device determines a flow coefficient value of the choke from a measured position value and a stored characteristic of the choke. The device then calculates a first value of the flow of the drilling fluid from the wellbore through the choke based on the flow coefficient value and a pressure differential measured across the choke. The device adjusts operation of the drilling system at least partially based on the calculated flow value. To adjust operation, the device can set the choke (or another choke) to a set flow value relative to the calculated first flow value. Density of the flow can also be determined so the device can adjust operation based on mass flow rate.

25 Claims, 11 Drawing Sheets (56) References Cited

U.S. PATENT DOCUMENTS

| | | | |
|---|---|---|---|
| 7,606,636 | B2 | 10/2009 | Dykstra |
| 7,636,614 | B2 | 12/2009 | Dykstra |
| 7,769,493 | B2 | 8/2010 | Elshafei et al. |
| 8,352,087 | B2 | 1/2013 | Yli-Koski |
| 2003/0024737 | A1 | 2/2003 | Chang et al. |
| 2005/0092523 | A1* | 5/2005 | McCaskill .............. E21B 21/08 175/38 |
| 2007/0151762 | A1 | 7/2007 | Reitsma |
| 2011/0094607 | A1 | 4/2011 | Elliott |
| 2012/0330466 | A1 | 12/2012 | Rodger |
| 2013/0327533 | A1* | 12/2013 | Veeningen .......... E21B 47/1025 166/345 |
| 2016/0102511 | A1 | 4/2016 | Brana |
| 2017/0009543 | A1* | 1/2017 | Lovorn ................... E21B 21/08 |

OTHER PUBLICATIONS

ABB Inc., "WedgeMaster FPD570," User Guide, copyright 2011, version dated Dec. 2011, 20-pgs.

OMEGA, "Transactions in Measurement and Control," Technical Reference vol. 4, copyright 2001, see pp. 16-33, 113-pgs.

Ferguson Enterprises, "About Cv (Flow Coefficients)," Technical Brochure, copyright 2012, version Mar. 2012.

* cited by examiner

DRILLING SYSTEM AND METHOD HAVING FLOW MEASUREMENT CHOKE

BACKGROUND OF THE DISCLOSURE

Figure 1A:
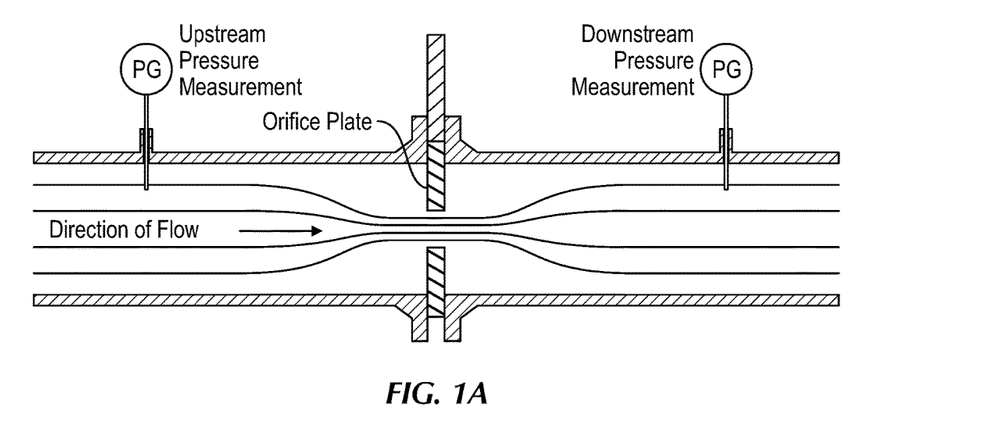
FIGS. 1A-1D illustrate different flowmeters according to the prior art.

Measuring flow through pipes has a number of uses in various industries and can be achieved in a number of ways. In a simple form, such as shown in FIG. 1A, for example, a pipe can be fitted with an orifice plate of known orifice size in the pipe's bore. Upstream and downstream pressure measurements across the orifice plate can then be used to measure the flow.

Figure 1B:
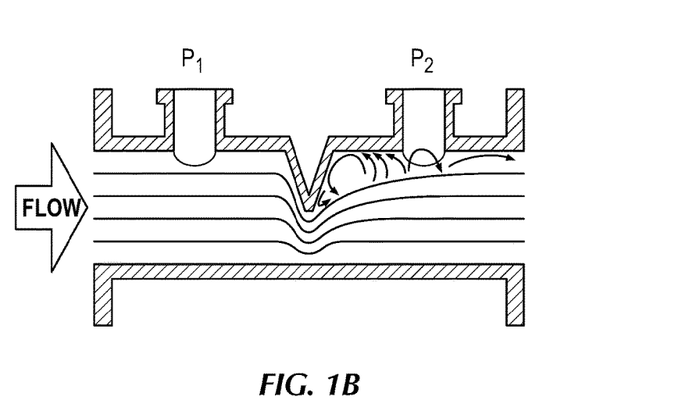

A pipe can alternatively be fitted with wedged restriction formed in the pipe's bore. As shown in FIG. 1B, for example, a wedge flowmeter is one type of meter with this configuration. A wedge ratio for the flowmeter is defined by d/D where d is a wedge opening height and D is a nominal pipe diameter. The wedge restriction is typically V-shaped at an angle to help in measuring viscous fluids. A first pressure gage can measure an upstream pressure measurement, while a second pressure gage can measure a downstream pressure measurement, subject to the pressure drop from the orifice plate or wedged restriction.

Figure 1C:
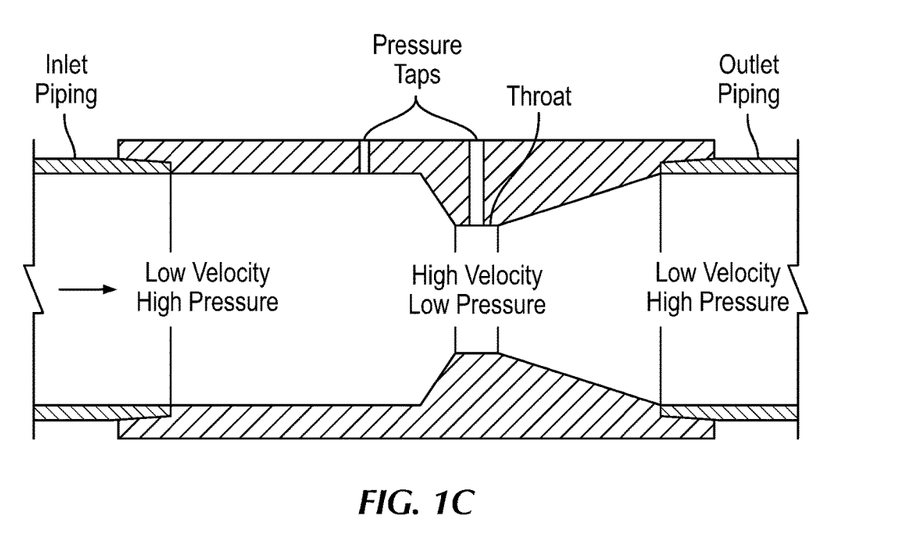
Figure 1D:
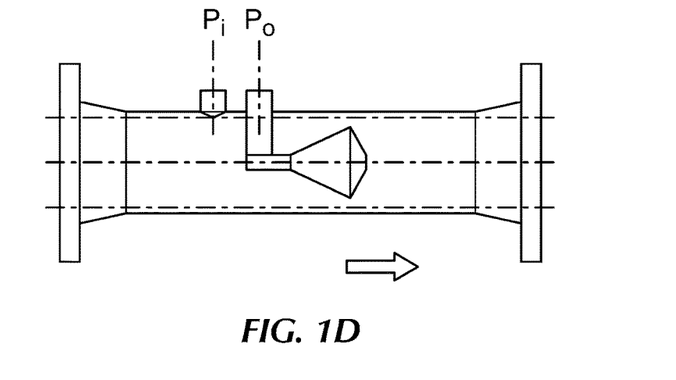

As shown in FIG. 1C, another configuration has a throat formed in the pipe's orifice. Pressure from a pressure tap upstream of the throat's restriction can be compared to pressure from a pressure tap at the throat's restriction. In yet another alternative shown in FIG. 1D, a cone can be positioned in the pipe's bore. Pressure from a pressure tap upstream of the cone can be compared to pressure from a conduit to the cone inside the pipe's bore.

In a drilling environment, drilling chokes are used in several applications to control the flow of production medium or drilling fluids. For example, well control for circulating a "kick" or underbalanced and near-balanced drilling applications often require the use of one or more drilling chokes. In addition, drilling chokes are useful for conventional well control issues involving exploration wells and drilling over-pressured zones, well testing operations and well clean ups that require flow control of the wellbore fluid to produce reliable test results.

In the drilling environment, flow measurement is a necessary element for performing various drilling operations, such as in well control operations. Devices, such as the wedge flowmeter, the V-cone flowmeter, or the like, may not be suitable for all drilling operations, especially those operation involving higher mud pressures. For this reason, the flow measurement in managed pressure drilling (MPD) is typically made using a Coriolis flowmeter. Using one of these dedicated Coriolis flowmeters in the drilling system can be expensive. Additionally, current Coriolis meters have pressure limitations of 1,500 to 2,800 psi. Drilling equipment typically requires pressures in the 5,000 to 10,000 psi range.

In drilling operations, maintaining the bottom hole pressure using a hydraulic model requires calculations that rely on knowing the density of the flow. However, measuring flow and density can be challenging in drilling environments. In general, the measurements from a Coriolis flowmeter in a drilling system can be used as a densitometer and a flowmeter.

Although effective, Coriolis flowmeters can be costly and can have lower pressure ratings than desired for some implementations. Other than a Coriolis flowmeter, existing density measurements rely on nuclear devices, gravity, etc. along with sensitive pressure sensors that have a low pressure rating. Therefore, these other techniques for measuring density are less favorable. This can be especially true when performing managed pressure drilling on a land-based rig as opposed to offshore. For land based rigs, for example, flow measurement for managed pressure drilling can be very useful and needed. However, adding a dedicated flowmeter, such as a Coriolis flowmeter, may not be the best solution.

The subject matter of the present disclosure is directed to overcoming, or at least reducing the effects of, one or more of the problems set forth above.

SUMMARY OF THE DISCLOSURE

According to the present disclosure, a set point choke is used for flow measurement in a drilling system. By measuring differential pressure across the choke, and by knowing the choke's position according to the Cv curve, a volumetric flow rate can be calculated from the drilling system.

In one embodiment, a drilling system has one set point choke with sensors (choke position, upstream pressure, and downstream pressure) for measuring flow of drilling fluid out of a wellbore. In another arrangement, more than one set point choke can be used, such as tandem chokes, with one or more of the chokes having the sensors for flow measurement.

In another arrangement, one or more set point chokes with sensors (choke position, upstream pressure, and downstream pressure) for flow measurement can be used with a Coriolis flowmeter. During operations, the Coriolis flowmeter can be used and isolated as desired as system parameters permit.

The arrangements with one or more set point chokes with sensors (choke position, upstream pressure, and downstream pressure) for flow measurement can also be used with pressure measurements obtained from pressure sensors on a riser, which can give average density of the drilling fluid for use in system control.

In a managed pressure drilling arrangement, a choke manifold can have one or more chokes with sensors (choke position, upstream pressure, and downstream pressure) for flow measurement. The manifold may or may not have a Coriolis flowmeter. Moreover, the managed pressure drilling arrangement can be used with a pressure measurement obtained from pressure sensors on a riser and the known vertical distance between the pressure sensors, which can give an average density of the drilling fluid for use in system control.

The foregoing summary is not intended to summarize each potential embodiment or every aspect of the present disclosure.

DETAILED DESCRIPTION OF THE DISCLOSURE

A. System Overview

Figure 2:
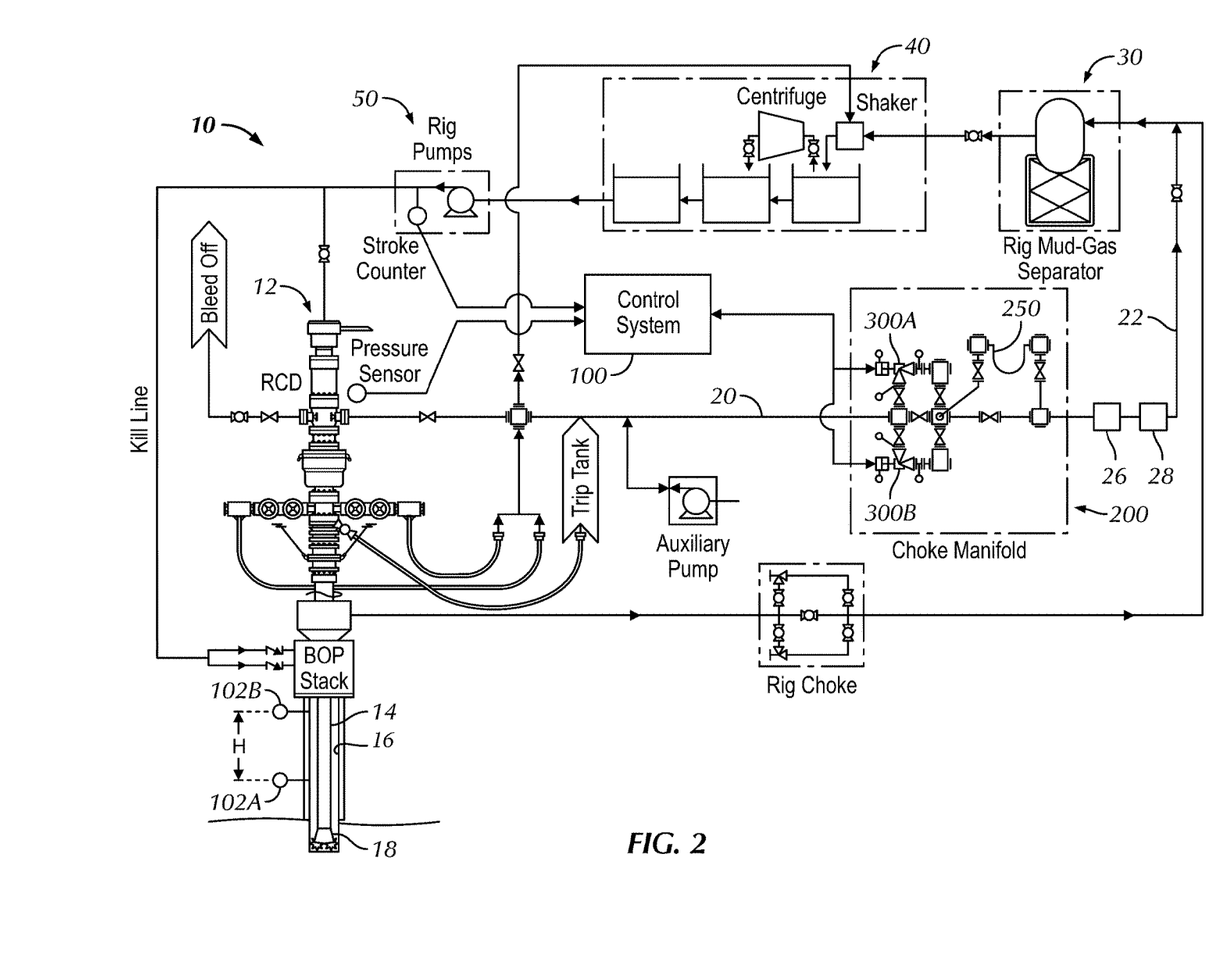
FIG. 2 illustrates a controlled pressure drilling system having a control system according to the present disclosure.

FIG. 2 shows a closed-loop drilling system 10 according to the present disclosure for controlled pressure drilling. As shown and discussed herein, this system 10 can be a Managed Pressure Drilling (MPD) system and, more particularly, a Constant Bottomhole Pressure (CBHP) form of MPD system. Although discussed in this context, the teachings of the present disclosure can apply equally to other types of controlled pressure drilling systems, such as other MPD systems (Pressurized Mud-Cap Drilling, Returns-Flow-Control Drilling, Dual Gradient Drilling, etc.) as well as to Underbalanced Drilling (UBD) systems, as will be appreciated by one skilled in the art having the benefit of the present disclosure.

The drilling system 10 has a rotating control device (RCD) 12 from which a drill string 14, a bottom hole assembly (BHA), and a drill bit 18 extend downhole in a wellbore through a formation. This arrangement is for an offshore installation, and a riser 16 extends from the drilling rig to the seafloor.

The system 10 also includes mud pumps 50, a standpipe (not shown), a mud tank 40, a mud gas separator 30, and various flow lines, as well as other conventional components. In addition to these, the drilling system 10 includes an automated choke manifold 200 that is incorporated into the other components of the system 10.

Finally, as also shown in FIG. 2, a control system 100 of the drilling system 10 is a computerized control that integrates hardware, software, and applications across the drilling system 10. The control system 100 is used for monitoring, measuring, and controlling parameters in the drilling system 10. In this contained environment of the closed-loop drilling system 10, minute wellbore influxes or losses are detectable at the surface, and the control system 100 can further analyze pressure and flow data to detect kicks, losses, and other events.

The automated choke manifold 200 manages pressure and flow during drilling and is incorporated into the drilling system 10 downstream from the rotating control device 12 and upstream from the gas separator 30. As briefly shown in FIG. 2, the manifold 200 has chokes 300A-B, a mass flowmeter 250, pressure sensors (not labelled), a local controller (not shown) to control operation of the manifold 200, and a hydraulic power unit (not shown) and/or electric motor to actuate the chokes 300A-B. The control system 100 is communicatively coupled to the manifold 200 and has a control panel with a user interface and processing capabilities to monitor and control the manifold 200. The control system 100 is also communicatively coupled to pressure sensors 102A-B at a vertical distance (H) on the riser 16, which measure a pressure differential in the fluid returns that eventually pass through the rotating control device 12 to the flow return line 20 of the system 10.

During operations, fluid leaving the wellbore flows through the riser 16 to the rotating control device 12. The rotating control device (RCD) 12 atop the BOP contains and diverts annular drilling returns through flow return line 20 to the automated choke manifold 200. The pressure sensors 102A-B on the riser 16 can measure the pressure differential of the return flow and the known vertical distance (H), which can be used to calculate a density of the fluid returns and can be used for calculations discussed below. The manifold 200 can also measure return flow and density using the flow meter 250 (if present) installed in line with the chokes 300A-B.

The chokes 300A-B of the manifold 200 are operated to control pressure in the system 10 by changing the surface back pressure of the fluid in the return line 20, riser 16, wellbore, etc. Moreover, as discussed in more detail later, the chokes 300A-B according to the present disclosure can be used to measure the return flow for the purposes of controlling the system 10.

Software components of the control system 100 then compare the flow rate in and out of the wellbore, the injection pressure (or standpipe pressure), the surface backpressure, the position of the chokes 300A-B, and the mud density. Comparing these variables, the control system 100 identifies minute downhole influxes and losses on a real-time basis to manage the annulus pressure during drilling. All of the monitored information can be displayed for the operator on the control panel of the control system 100.

As noted above, controlling pressure during drilling essentially requires moving the chokes 300A-B with a control to achieve a necessary amount of pressure or flow according to the purposes of the well control operations governed by the control system 100. Therefore, an element of this automation is a control-loop feedback mechanism that consists of a control tailored to characterize the MPD equipment (e.g., choke actuators) and is capable of adapting to changing dynamics, such as mud systems, well compressibility, drilling windows, and surface equipment limitations.

In one embodiment, therefore, the drilling system 10 of the present disclosure has one set point choke 300 with sensors 205, 210, 220 (choke position, upstream pressure, and downstream pressure) for flow measurement. In another arrangement, more than one set point choke 300 can be used, such as tandem chokes 300A-B on a manifold 200, with one or more of the chokes 300 having the sensors 205, 210, 220 for flow measurement.

In another arrangement, one or more set point chokes 300 with sensors 205, 210, 220 (choke position, upstream pressure, and downstream pressure) for flow measurement can be used with a Coriolis flowmeter 250. During operations, the Coriolis flowmeter 250 can be used and isolated as desired and as the system's parameters permit. Density reading from the Coriolis flowmeter 250 can be combined with the flow measurements from the one or more chokes 300. Also, flow measurements from the Coriolis flowmeter 250 can be used to calibrate the flow measurements made with the one or more chokes 300.

The arrangements with one or more set point chokes 300 with sensors 205, 210, 220 (choke position, upstream pressure, and downstream pressure) for flow measurement can also be used with pressure measurements obtained from pressure sensors 102A-B on a riser and their known vertical distance (H), which can give average density of the drilling fluid for use in system control. For example, the pressure readings and the known vertical distance (H) between the pressure sensors 102A-B can calculate the density of the drilling returns based on:

$$\rho = \Delta P / gh$$

where
ρ=Average Density of the Fluid
g=Gravity constant
h=Vertical Height of the column of fluid
ΔP (Static)=Difference in pressure due to the height.

In managed pressure drilling arrangements, choke manifolds 200 can have one or more chokes 300 with sensors 205, 210, 220 (choke position, upstream pressure, and downstream pressure) for flow measurement. The chokes can be set to set flow values to control operation of the drilling system, and the control of the system can repeat determinations, calculations, and adjustments in setting the chokes to refine the system control.

The manifold 200 can have a Coriolis flowmeter 250 or not. Moreover, the managed pressure drilling arrangements can be used with pressure measurements obtained from pressure sensors 102A-B on a riser at a vertical distance (H), which can give average density of the drilling fluid for use in system control.

B. Choke Manifold

Figure 3A:
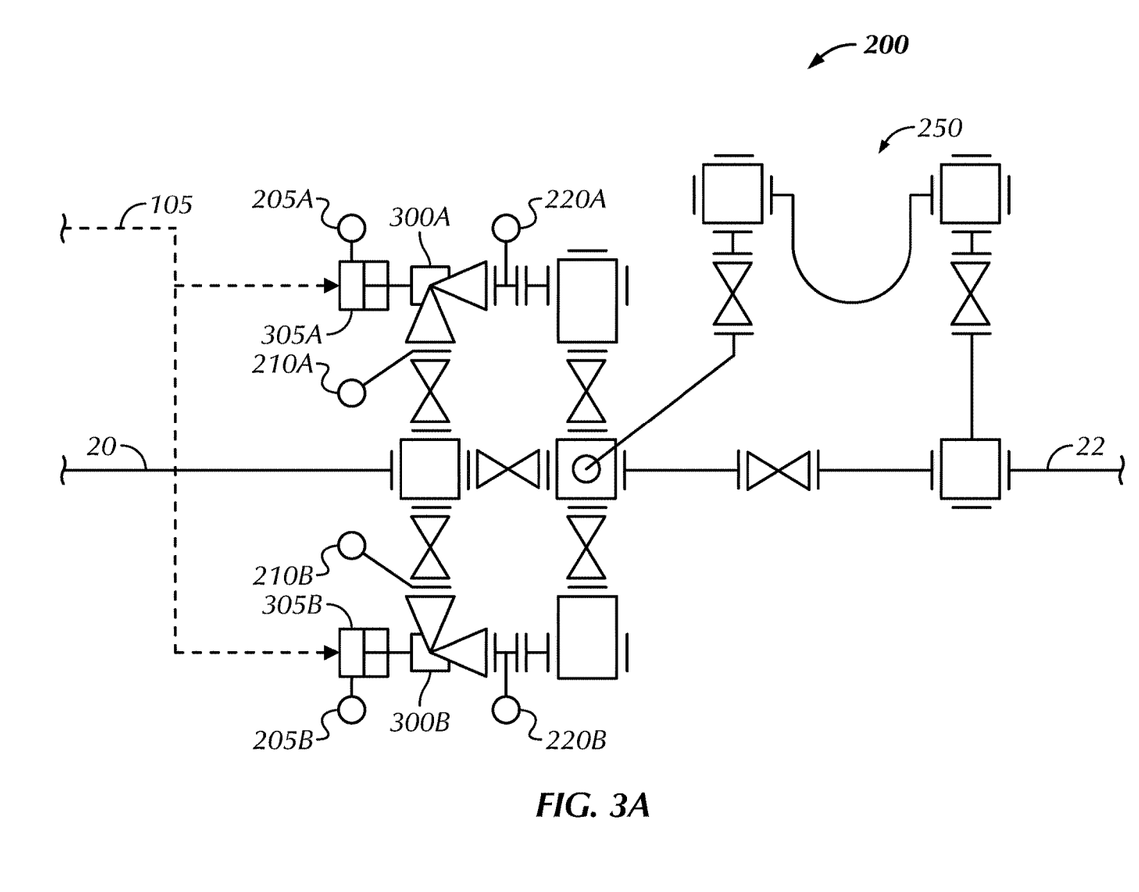
FIGS. 3A-3C illustrate arrangements of choke manifolds for the disclosed system.

As noted above, the choke manifold 200 of the present disclosure is not only used to control surface back pressure in the managed pressure drilling, but the chokes 300 on the manifold 200 can be used to measure parameters of the return flow. FIG. 3A illustrates a detail of the choke manifold 200 of the system 10 in FIG. 2. The manifold 200 includes at least one choke 300. Here, tandem chokes 300A-B are shown in the present embodiment. Flow from the return line 20 branches off to the tandem chokes 300A-B before being recombined. A flowmeter (shown here as a Coriolis flowmeter 250) can be connected to the flow from the chokes 300A-B before the flow continues on along the continuing return line 22. Valves and other piping arrangements can allow the flowmeter 250 to be bypassed and taken offline.

The chokes 300A-B of the manifold 200 are used to control the surface back pressure in the system (10) by controllably choking the return flow from the line 20. For instance, control signals 105 from the control system (100) adjust the positions of the chokes 300A-B to maintain drilling parameters associated with managed pressure drilling. However, the chokes 300A-B are not just used for that purpose. At least one of the chokes 300A-B is a set point choke that operates as a flowmeter in the drilling system (10) for flow measurement. In the present arrangement, both of the chokes 300A-B are configured to operate as flowmeters.

In particular, the flow measurement chokes 300A-B have pressure sensors 210A-B, 220A-B on upstream and downstream sides of the choke 300A-B. Additionally, the actuators 305A-B for the chokes 300A-B having position sensors 205A-B. During operations, the pressure sensors 210A-B, 220A-B provide pressure readings, which are used in conjunction with the positions of the chokes 300A-B (from the position sensors 305A-B) and other factors discussed herein to determine a flow measurement for the drilling system's control. The flow measurement obtained by the at least one choke 300A-B can be used instead of (or in conjunction with) any other flow measurements obtained, for example, by the Coriolis flowmeter 250. Moreover, any flow measurements from the Coriolis flowmeter 250 can be used as feedback in calibrating the chokes 300A-B for use in measuring flow.

Figure 3B:
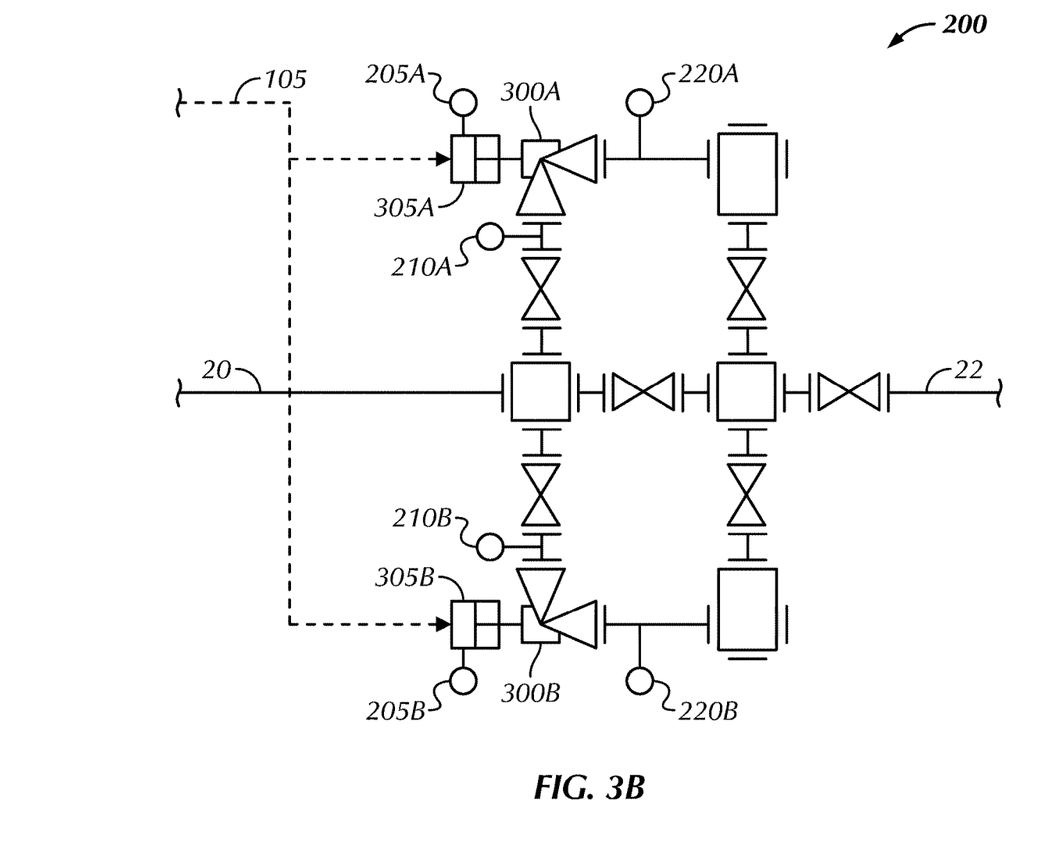

FIG. 3B shows a similar arrangement of a choke manifold 200 for the disclosed system. Here, the manifold 200 specifically lacks a redundant flowmeter, such as a Coriolis flowmeter 250, as in the previous arrangement of FIG. 3A. One or both of the chokes 300A-B of the manifold 200 are used for making flow measurements according to the purposes of controlling the system.

Figure 3C:
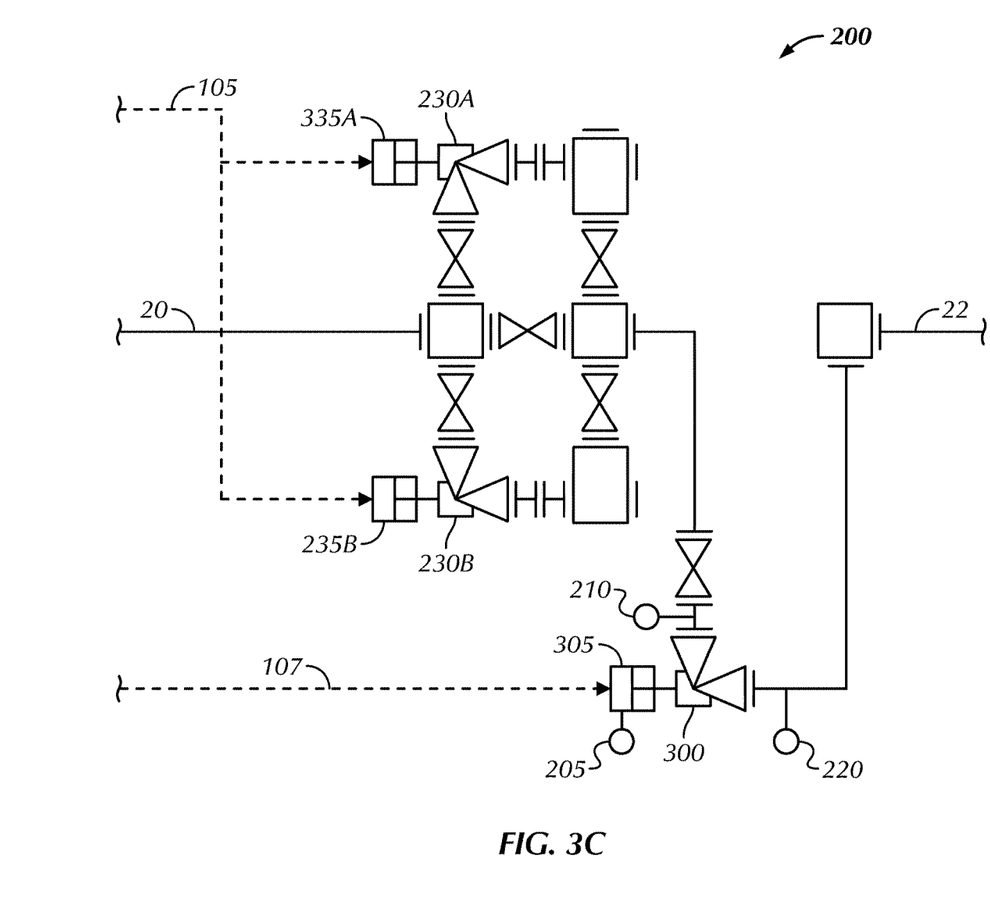

FIG. 3C shows a different arrangement of a choke manifold 200 for the disclosed system. Here, the manifold 200 specifically lacks a redundant flowmeter, such as a Coriolis flowmeter 250, as in the previous arrangement of FIG. 3A. Additionally, control chokes 230 of the manifold 200 are used for controlling pressure in the system by receiving control signals 105 that operate the chokes' actuators 235A-B to adjust the chokes' positions.

For this manifold 200, the flowmeter is a set point choke 300 in the drilling system for flow measurement. The flow measurement choke 300 is disposed in line downstream of the control chokes 230 in the choke manifold 200. Pressure sensors 210, 220 on upstream and downstream sides of the flow measurement choke 300 provide pressure readings, which are used in conjunction with a position of the choke 300 (from a position sensor 305) and other factors discussed herein to determine a flow measurement for the drilling system's control.

Because the flow measurement choke 300 is downstream of the chokes 230 in the manifold 200, the flow measurement choke 300 may also be used to provide flow control for the purposes of managed pressure drilling. The flow measurement choke 300 may also provide a certain amount of backpressure within the manifold's control chokes 230 in a way that improves their performance and position control.

Various system of sensors and devices can be used to make the desired pressure readings. In general, such sensors or devices can be rated for the high pressures involve in drilling operations, such as during managed pressure drilling. As such, the sensors and devices should be rated for pressures in the typical pressure rating ranges of drilling equipment, such as the 5,000 to 10,000 psi range.

C. Set Point Choke

Figure 4:
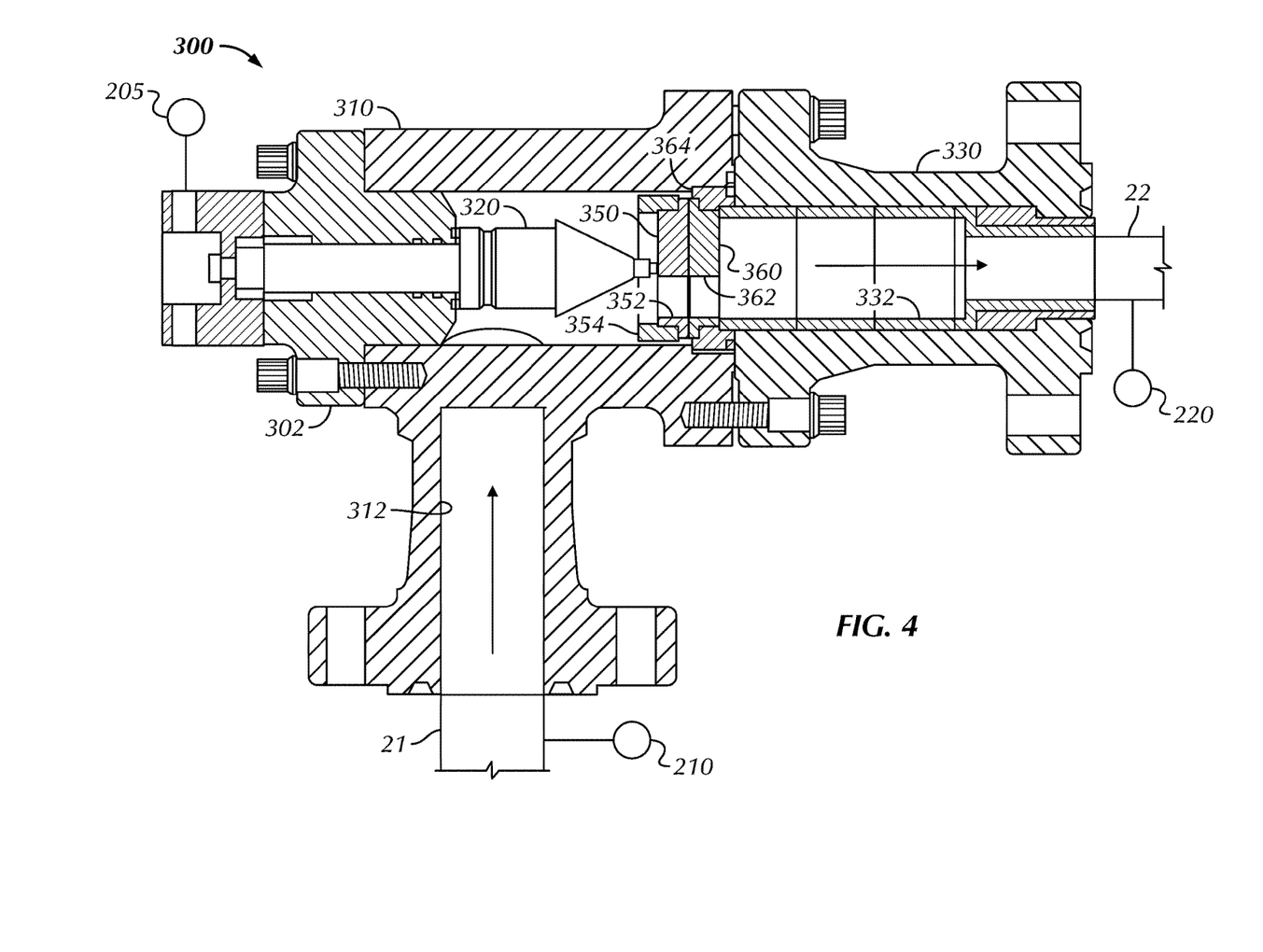
FIG. 4 illustrates an embodiment of a set point choke for use in the disclosed flow measurement arrangements of the present disclosure.

FIG. 4 illustrates an embodiment of a set point choke 300 for use in the disclosed arrangements. The choke 300 includes a housing 310 having an inlet 312 that connects to inlet piping 21. A bonnet 302 for an actuator is connected to the housing 310, and a spool 330 connects the housing 310 to outlet piping 22. Within the drilling choke's housing 310, two tungsten carbide discs 350/360 control fluid flow from the housing's inlet 312 to the choke's outlet spool 330.

In this embodiment, front and back discs 350/360 of the choke 300 each have machined-through bores 352/362, respectively, and are positioned in holders 354/364. Drilling fluid passes through inlet 312 into the choke's housing 310 and passes a profiled throttling stem 320 holding the discs 350/360 together against a lower holder 364. The throttling stem 320 can be operated to rotate the front disc 350 relative to the stationary back disc 360, thereby determining the orifice size through the bores 352/362 and throttling fluid flow through the choke 300. The outlet spool 330 can having inserts 332 of erosion resistant material.

A position sensor 205 is operably connected to the actuator's components at the bonnet 302. For example, the position sensor 205 can directly couple to the valve stem at the bonnet 302 and can be a potentiometer or other device. An upstream pressure sensor 210 measures the inlet pressure of the choke 300. This upstream pressure sensor 210 can be associated with the inlet piping 21 at or near the choke 300, although it could be further upstream. A downstream pressure sensor 220 measures the outlet pressure of the choke 300. This downstream pressure sensor 220 can be associated with the outlet piping 22 at or near the choke 300, although it could be further downstream.

In fact, the choke 300 may be modified with pressure taps for the pressure sensors 210, 220 or the like to make the needed pressure measurements. Alternatively, the pressure sensors 210, 220 can be used in tubing, spools, connections or the like connected upstream and downstream of the choke 300.

By measuring differential pressure ($\Delta P=P_{220}-P_{210}$) across the choke 300 and by knowing the choke's position according to a Cv curve, a volumetric flow rate can be determined. This form of measurement ties into the existing software for the set point choke 300. The choke 300 has an orifice (i.e., discs 350/360) in the fluid flow and measures the pressure differential across the orifice. In this case, the orifice (i.e., discs 350/360) is variable and doubles as a flow control device. In this way, the choke 300 is used a differential pressure-based flowmeter and provides a calculation of flow based on the choke's position and Cv curve.

D. Controls

The flow measurement choke 300 as in FIGS. 3A-3C used for measuring flow and controlling pressure can have its response controlled by a PID type or other type of control. During operations, for example, the choke's response (i.e., movement, speed, and accuracy) are determined by the choke's controls. Typically, a proportional-integral-derivative (PID) control is used to control the choke 300 to change pressure or flow in the system 10. Such PID control is a common component of industrial automation, aviation, and other processes. In controlled drilling operations, the PID control provides the feedback used to adjust and stabilize wellbore pressure and flow.

Figure 5A:
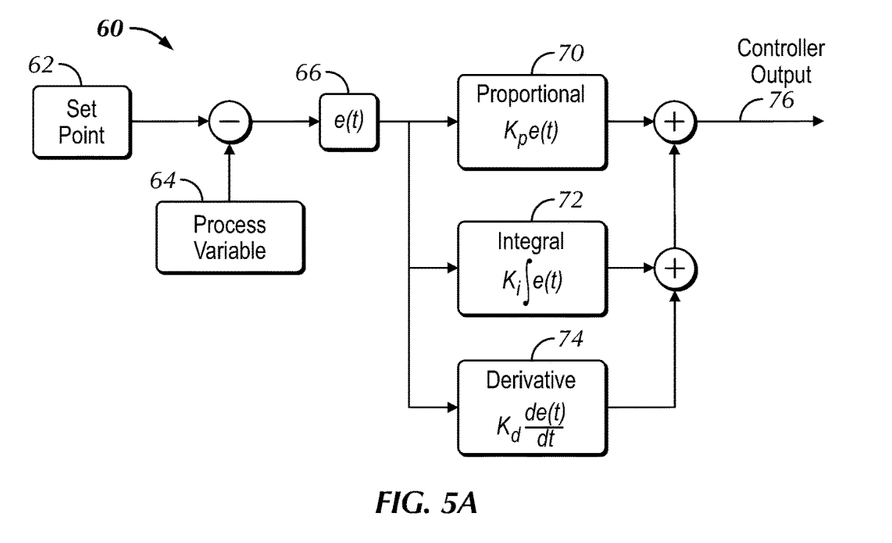
FIG. 5A illustrates a proportional-integral-derivative (PID) control that can be used in controlled pressure drilling.

FIG. 5A illustrates a proportional-integral-derivative (PID) control 60 that can be used in controlled pressure drilling to control a flow measurement choke (e.g., 300) of the present disclosure. In this control 60, a process variable 64 (e.g., current surface backpressure in the drilling system 10, current choke position, etc.) is compared to a configured set point 62 to calculate an error 66. That error 66 can then be operated on by one or more of: a proportional gain (Kp) times the magnitude of the error (e(t)) (70), an integral gain (Ki) times the integral of the error (e(t)) (72), and a derivative gain (Kd) times the derivative of the error (e(t)) (74). The one or more of these are then summed together to provide a control output 76 (e.g., a new pressure, a new choke position, etc.).

Figure 5B:
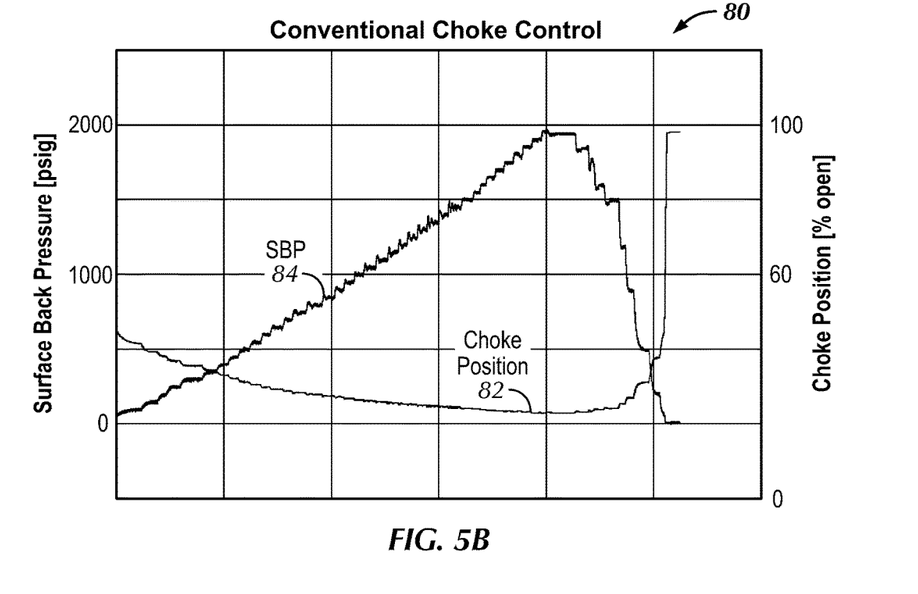
FIG. 5B graphs PID control of a choke showing the surface backpressure change relative to the controlled choke position.

FIG. 5B graphs the form of PID control of a flow measurement choke (e.g., 300 of FIGS. 3A-3C) of the present disclosure showing the surface backpressure changes relative to the controlled choke position in the drilling system (10). This graph shows how the PID control (60: FIG. 5A) may function to control surface backpressure. The choke position 82 is adjusted over time with the PID control 60 to affect the surface backpressure 84, which is graphed for comparative purposes. As it appears, the choke position 82 is adjusted closed as the surface backpressure continues to rise and reaches a peak level of almost 2000-psig. A sudden drop in the surface backpressure 84 then follows, and the choke position 82 is rapidly adjusted open.

Per conventional practices, tuning for the various gains 70, 72, and 74 in FIG. 5A of the PID control 60 may be handled manually by operators of the drilling system 10 to achieve a desired system response. According to the techniques disclosed herein, however, data related to the flow coefficient of the choke 300 is used as a tuning factor within the flow measurement choke (300) of the present disclosure.

E. Flow Coefficient

As is generally known, flow coefficient (Cv) is a dimensionless variable that relates flow rate of a choke valve (e.g., flow measurement choke 300 of FIGS. 3A-3C) to the differential pressure produced. The flow coefficient Cv can be provided as an index value equivalent to the gallons per minute of water at standard temperature (60° F.=16° C.) that will flow through a valve or fitting at a pressure differential across the valve of 1-psi.

For an incompressible type of fluid, for example, a valve's flow coefficient (Cv) can be calculated using the equation:

$$C_v = \frac{Q}{\sqrt{\frac{DP}{SG}}}$$

where:
Q— Flow rate,
DP— Differential pressure at the valve, and
SG—Specific gravity of the fluid.

The equation for a compressible type of fluid includes considerations of various factors, such as absolute upstream temperature, gas specific gravity, upstream absolute static pressure, expansion factor, etc. Particular equations are provided by The International Society of Automation's control valve standards, such as ISA-75.

In the context of the drilling system 10 of the present disclosure, the flow coefficient (Cv) of interest is not strictly calculated. Instead, the flow coefficient (Cv) depends on the fluids involved and choke valve's design. To that end, the flow coefficient character of the present disclosure relating the flow coefficient (Cv) to choke positions is configured for the particular choke 300 used in the drilling system 10, type of fluid, and other conditions.

In the calculations of the present disclosure, the character of the flow coefficient (Cv) for the choke(s) is parameterized. Then, by knowing the choke's position, the flow coefficient (Cv) can be obtained from the parameterization. In turn, the known flow coefficient (Cv) and measured pressure differential (dP) at the choke 300 can be used to calculate a flow rate Q according to the equation:

$$Q=C_v*F(DP)$$

where Q is flow rate; Cv is the flow coefficient; and DP is the differential pressure at the choke with F(DP) being a function thereof. This flow rate calculated for the choke 300 can then be used for the flow measurements in control and operation of the system 10.

Figure 5C:
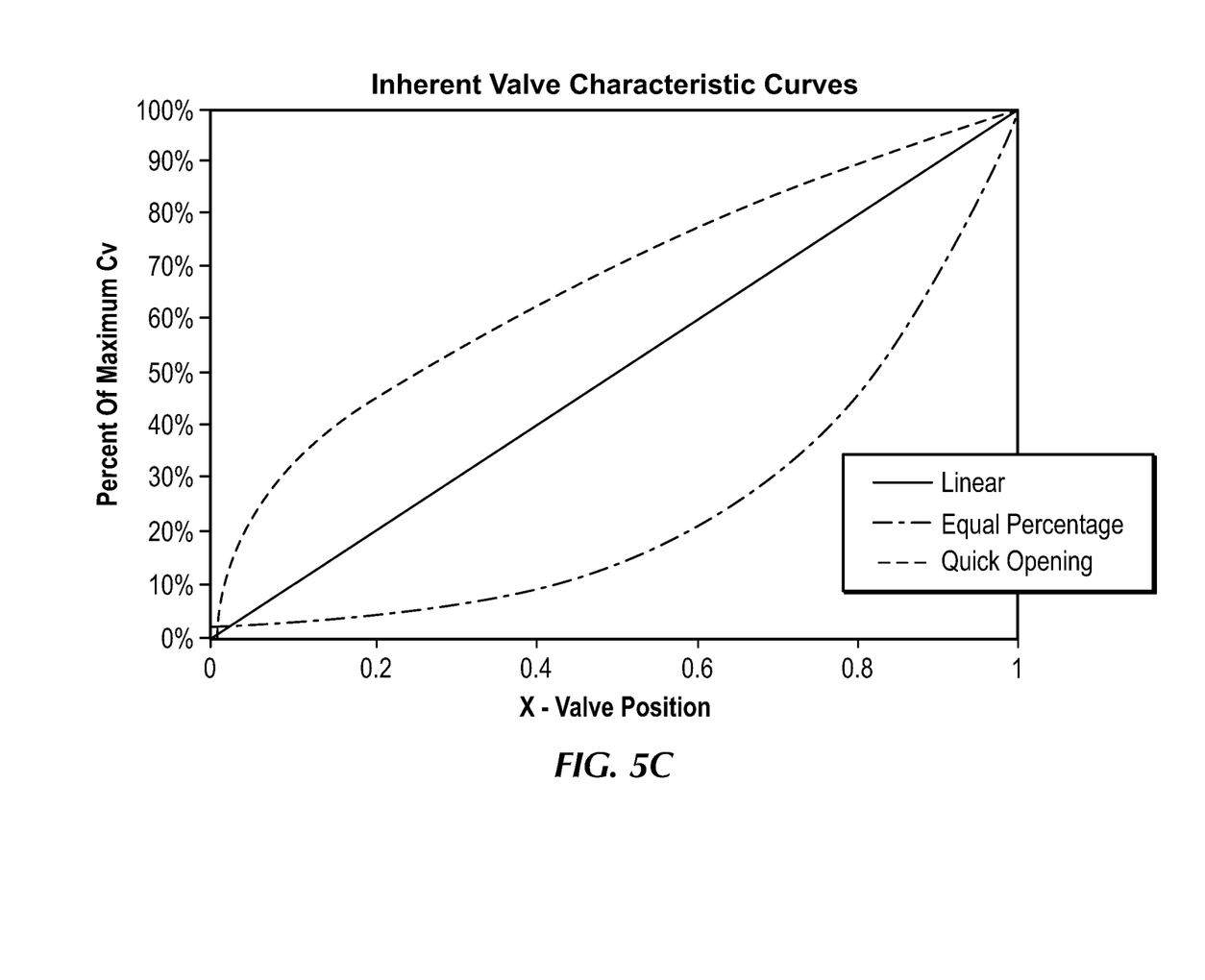
FIG. 5C graphs the flow coefficient character relative to the choke valve positions for types of chokes.

FIG. 5C graphs curves for flow coefficient character (Cv) versus valve-member position of three types of choke valves—namely, a linear valve, an equal percentage valve, and a quick opening valve. The ordinate shows the valve-members stroke from the fully closed position (0) to fully opened position (1), and the abscissa shows the percentage of the maximum flow coefficient exhibited by the different types of choke valves.

It is recognized that a given choke flow coefficient (Cv) curve has a non-linear relationship to the choke's position, and the changes in response are significant with changes in flow rate and density. As the graph of FIG. 5C helps elucidate, knowing the flow coefficient character of the particular choke (e.g., 300) in the drilling system (10) allows the control system (100) to tune the choke's response based at least on the choke's position and to determine valve position for flow measurement calculations, although further consideration can be given based on type of fluid and other considerations.

F. Control System

Figure 6:
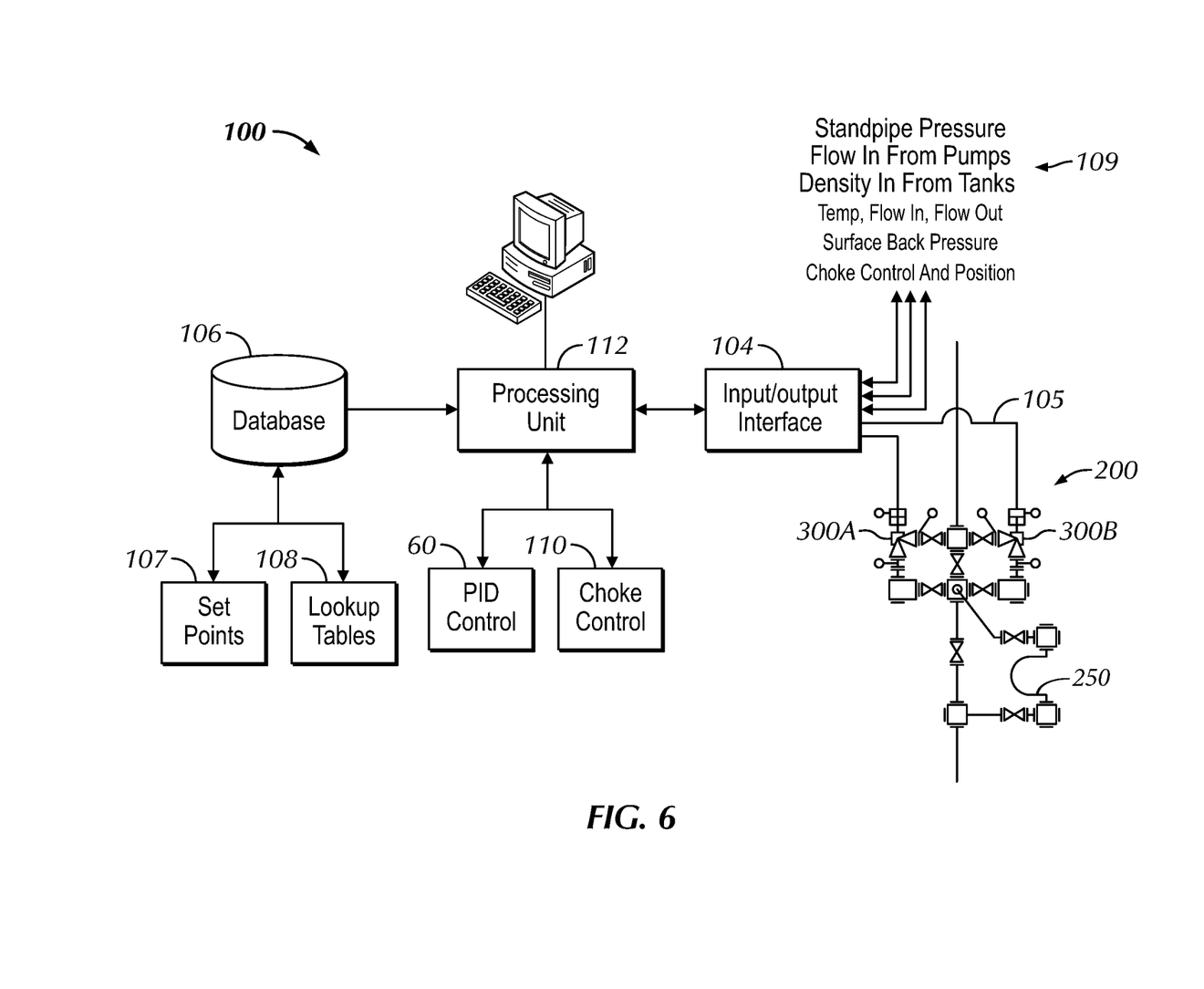
FIG. 6 illustrates a choke control according to the present disclosure.

FIG. 6 schematically illustrates some details of the control system 100 of the present disclosure. The control system 100 includes a processing unit 112, which can be part of a computer system, a server, a programmable control device, a programmable logic controller, etc. Using input/output interfaces 104, the processing unit 112 can communicate with the choke(s) 300 and other system components to obtain and send communication, sensor, actuator, and control signals 105/109 for the various system components as the case may be. In terms of the current controls discussed, the signals 105/109 can include, but are not limited to, the choke position signals, pressure signals, flow signals, temperature signals, fluid density signals, etc.

The processing unit 112 also communicatively couples to a database or storage 106 having set points 107, lookup tables 108, and other stored information. The lookup tables 108 characterize the specifications of the chokes 300 and the flow coefficient Cv character (e.g., flow coefficient versus choke position) of the chokes 300. This information can be defined by the choke's manufacture and can be defined through testing of the chokes 300.

The choke(s) 300 can be calibrated in conjunction with a Coriolis or other volume/mass flow measuring device, such as the Coriolis flowmeter 250 in FIG. 3A. Data recording equipment can develop a "look up table" for a given set of conditions that would correlate the conventional flow measuring device 250's measurement directly with the choke's flow measurement. The set point choke 300 can then be calibrated in conjunction with a Coriolis or other volume/mass flow measuring device.

In fact as noted above with reference to FIG. 3A, a given system can be installed with both a conventional (e.g., Coriolis) flowmeter 250 and one or more set point chokes 300 for measuring flow according to the present disclosure. If the conventional flowmeter 250 were to be taken offline, the choke 300 can be used to accurately measure flow for the given set of conditions. This could be a self-learning system in which current flow measurements by the choke 300 are updated and corrected by measurements from the flowmeter so that correction information can be stored and used when needed.

Although lookup tables 108 can be used, it will be appreciated that any other form of curve, function, data set, etc. can be used to store the flow coefficient character. Additionally, multiple lookup tables 108 or the like can be stored and can be characterized based on different chokes, different drilling fluids, different operating condition, and other scenarios and arrangements.

Finally, the processing unit 112 can operate a choke control 110 according to the present disclosure for monitoring, tuning, and controlling the choke(s) 300. For example, the processing unit 112 can transmits signals 105 to one or more of the chokes 300 of the system 10 using any suitable communication. In general, the signals 105 are indicative of a choke position or position adjustment to be applied to the chokes 300. Typically, the chokes 300 are controlled by hydraulic power so that the signals 105 transmitted by the processing unit 112 may be electronic signals that operate solenoids, valves, or the like of a hydraulic power unit for operating the chokes 300.

As shown here and in FIG. 6, two chokes 300A-B may be used. The same choke control 110 can apply adjustments to both chokes 300A-B, or separate choke controls 110 can be used for each choke 300A-B. In fact, the two chokes 300A-B may have differences that can be accounted for in the two choke controls 110 used.

As discussed herein, the control system 100 uses the choke control 110 tuned in real-time using interpolated flow coefficient Cv data (108) based on choke position signals (109). A relative choke position set point (107) is calculated instead of an absolute position set point (0% to 100%) in real-time and applied to a desired position for the choke(s) 300A-B to achieve the purposes of the controlled pressure drilling. In other words, the choke control 110 uses the choke's flow coefficient (Cv) for tuning the control and determining the required adjustment to the current choke position, instead of determining an absolute choke position as conventionally done. This tuning provides the required control response as conditions change and the choke(s) 300A-B operates in its upper or lower ranges of the Cv curve, which can improve performance of the choke manifold 200.

Moreover, as discussed herein, the control system 100 uses the interpolated flow coefficient Cv data (108) based on choke position signals (109) and uses pressure measurements associated with the choke(s) 300A-B of the manifold 200 to calculate flow measurements for the system. Details of these flow measurement calculations are provided in FIGS. 7A-7B.

Figure 7A:
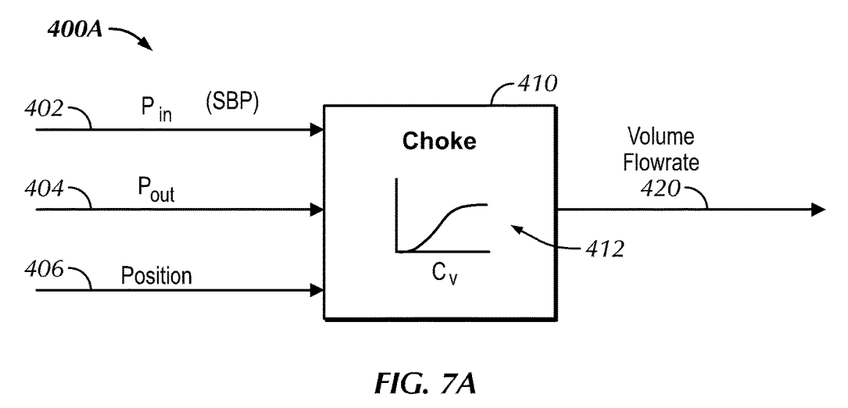
FIGS. 7A-7B illustrate schematic controls of the present disclosure.
Figure 7B:
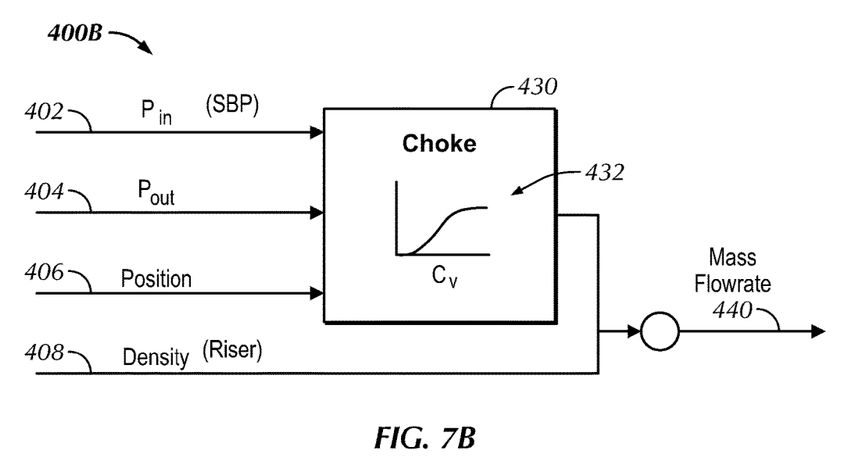

In particular, FIGS. 7A-7B illustrate control schematics 400A-B for the present disclosure. The control schematic 400A of FIG. 7A is useful for calculating volumetric flow rate through a set point choke 300 of the present disclosure. Inputs include pressure-in 402, pressure-out 404, and position 406, which are obtained from sensors of the system 10 associated with the choke 300. For example, the pressure-in input 402 can come from a surface back pressure sensor in the main line (20) from the wellbore or may come from a dedicated sensor (210) associated with or part of the choke (300). The pressure-out input 404 and the position input 406 would likely come from sensors (205, 220) associate with or part of the choke (300).

The inputs 402, 404, and 406 are fed into the choke's parameters 410, which include the choke's flow coefficient character 412. In particular, the pressure differential DP (pressure-in 402 minus pressure-out 404) is determined, and a value from the flow coefficient Cv of the choke (300) is determined from the current choke position indicated from the position sensor (205). A volumetric flow rate value Q is then calculated as the product of the flow coefficient Cv value times a function of the pressure differential DP. The control schematic 400A outputs a volumetric flow rate 420 that can be used by the system (10) for various purposes outlined herein.

The control schematic 400B of FIG. 7B is useful for calculating mass flow rate in a controlled pressure drilling system having flow measurement choke(s) 300 of the present disclosure. Again, inputs including the pressure-in 402, the pressure-out 404, and the position 406 are fed into the system's parameters 430, which include the choke's flow coefficient Cv character 432, and a volumetric flow rate 420 is calculated as before. Additionally, a density measurement 408 of the flow is then combined with the volumetric flow rate 420 calculated from the system's parameters 430 to provide a mass flow rate 440 for the system.

In particular, the density measurement 408 can come from the pressure differential measurement in the riser of the system (10), such as discussed previously in FIG. 2. Alternatively, other sources of the density measurement can be used, such as a Coriolis flowmeter or other device if available.

As will be appreciated, teachings of the present disclosure can be implemented in digital electronic circuitry, computer hardware, computer firmware, computer software, or any combination thereof. Teachings of the present disclosure can be implemented in a computer program product tangibly embodied in a machine-readable storage device for execution by a programmable processor so that the programmable processor executing program instructions can perform functions of the present disclosure. To that end, a programmable storage device having program instructions stored thereon for causing a programmable control device can perform the teachings of the present disclosure.

The teachings of the present disclosure can be implemented advantageously in one or more computer programs that are executable on a programmable system including at least one programmable processor coupled to receive data and instructions from, and to transmit data and instructions to, a data storage system, at least one input device, and at least one output device. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A drilling system, comprising:
a first choke in communication with flow of drilling fluid from a wellbore, wherein the first choke is adjustable;
a storage storing a characteristic of the first choke relating flow coefficient to position, the flow coefficient being a dimensionless variable relating a flow rate to a differential pressure produced by the first choke;
a first sensor measuring a first pressure value upstream of the first choke;
a second sensor measuring a second pressure value downstream of the first choke;
a third sensor measuring a position value of the first choke; and
a programmable control device communicatively coupled to the storage and the first, second, and third sensors, the device programmed to:
determine a flow coefficient value of the first choke from the measured position value and the stored characteristic,
calculate a first value of the flow of the drilling fluid from the wellbore through the first choke based on the flow coefficient value and a first pressure differential between the first and second pressure values; and
adjust operation of the drilling system at least partially based on the calculated flow value.

2. The system of claim 1, wherein the first and second sensors are integral to the first choke.

3. The system of claim 1, further comprising a second choke in communication with the flow of the drilling fluid from the wellbore and being adjustable, wherein to adjust the operation of the drilling system, the device is programmed to set the second choke to a set flow value relative to the calculated first flow value.

4. The system of claim 1, wherein to adjust the operation of the drilling system, the device is programmed to set the first choke to a set flow value relative to the calculated first flow value.

5. The system of claim 4, wherein to adjust the operation of the drilling system, the device is programmed to adjust a flow rate or a pressure of the flow of drilling fluid out of the wellbore using the first choke.

6. The system of claim 4, wherein to set the first choke, the device is programmed to determine, calculate, and adjust in repetition.

7. The system of claim 1, further comprising a flowmeter in communication with the flow of the drilling fluid from the wellbore and measuring a second value of the flow of the drilling fluid from the wellbore, wherein the device is programmed to calibrate the characteristic of the first choke based on a comparison of the calculated first flow value from the first choke and the measured second flow value from the flowmeter.

8. The system of claim 7, wherein the flowmeter is selectively isolatable from the flow of the drilling fluid.

9. The system of claim 1, further comprising:
a riser conducting the flow upstream of the first choke;
two pressure sensors in communication with the flow upstream of the first choke and separated by a head distance, at least one of the two pressure sensors disposed on the riser,
wherein the device is further programmed to:
calculate a second pressure differential between the two pressure sensors;
determine a value of density of the drilling fluid in the flow using the calculated second pressure differential and the head distance; and
calculate a mass flow rate using the calculated first flow value and the determined density value.

10. The system of claim 9, wherein one of the two pressure sensors includes the first sensor.

11. The system of claim 9, wherein to adjust the operation of the drilling system, the device is programmed to adjust the operation of the drilling system at least partially based on the calculated mass flow rate.

12. The system of claim 1, wherein to adjust the operation of the drilling system, the device is programmed to adjust a surface back pressure in the wellbore, adjust a mass flow rate of drilling fluid out of the wellbore, adjust a pressure during make-up of a drillpipe connection while drilling with the drilling system, adjust a pressure during a loss detected while drilling with the drilling system, or adjust the flow during a kick detected while drilling with the drilling system.

13. The system of claim 1, wherein the first sensor is disposed in the drilling system to measure a surface back pressure of the flow or is disposed in conjunction with the first choke.

14. The system of claim 1, wherein the calculated first flow valve is a volumetric flow rate of the drilling fluid from the wellbore.

15. A method, implemented by a computerized control, of drilling a wellbore with a drilling system having a first choke, the method comprising:
- obtaining, with the computerized control, a measured value of a parameter in the drilling system;
- obtaining, with the computerized control, first indications of a flow coefficient character of the first choke and a current position of the first choke, the flow coefficient characteristic of the first choke relating flow coefficient to position, the flow coefficient being a dimensionless variable relating a flow rate to a differential pressure produced by the first choke;
- obtaining, with the computerized control, second indications of a first pressure measured upstream of the first choke and a second pressure measured downstream of the first choke;
- calculating, with the computerized control, a first value of the flow from the wellbore through the first choke based on a flow coefficient value from the first indications and a first pressure differential from the second indications; and
- adjusting, with the computerized control, the parameter in the drilling system at least partially based on the calculated flow value.

16. The method of claim 15, wherein obtaining the flow coefficient value of the first choke comprises obtaining the flow coefficient value for the first choke at the current position from stored information of the flow coefficient character of the first choke.

17. The method of claim 16, wherein obtaining the flow coefficient value for the first choke at the current position comprises interpolating the flow coefficient value from the stored information.

18. The method claim 15, wherein adjusting, with the computerized control, the parameter in the drilling system at least partially based on the calculated flow value comprises adjusting a second choke in communication with the flow of the drilling fluid from the wellbore to a set flow value relative to the calculated first flow value.

19. The method claim 15, wherein adjusting, with the computerized control, the parameter in the drilling system at least partially based on the calculated flow value comprises adjusting the first choke to a set flow value relative to the calculated first flow value.

20. The method of claim 15, wherein adjusting the parameter comprises adjusting a flow rate or a pressure of the flow of the drilling fluid out of the wellbore using the first choke.

21. The method of claim 15, further comprising:
- measuring a second value of the flow of the drilling fluid from the wellbore with a flowmeter in communication with the flow of the drilling fluid from the wellbore; and
- calibrating the flow coefficient character of the first choke based on a comparison of the calculated first flow value from the first choke and the measured second flow value from the flowmeter.

22. The method of claim 21, further comprising selectively isolating the flowmeter from the flow of the drilling fluid.

23. The method of claim 15, further comprising
- obtaining, with the computerized control, third indications of third and fourth pressures measured by two pressure sensors in communication with the flow upstream of the first choke and separated by a head distance;
- calculating a second pressure differential from the third indications;
- determining a value of density of the drilling fluid in the flow using the calculated second pressure differential and the head distance; and
- calculating a mass flow rate using the calculated first flow value and the determined density value.

24. The method of claim 23, wherein adjusting the parameter in the drilling system comprising adjusting the parameter at least partially based on the calculated mass flow rate.

25. The method of claim 24, wherein adjusting the parameter in the drilling system comprises adjusting a surface back pressure in the wellbore, a mass flow rate of drilling fluid out of the wellbore, a pressure during make-up of a drillpipe connection while drilling with the drilling system, a pressure during a loss detected while drilling with the drilling system, or the flow during a kick detected while drilling with the drilling system.

* * * * *